United States Patent
Pignol et al.

Patent Number: 6,164,594
Date of Patent: Dec. 26, 2000

[54] DEVICE FOR BRAKING THE FALL OF A LOAD

[75] Inventors: Marc Pignol, Plaisance du Touch; Guy Valembois, Blagnac; Christian Larre, Grisolles; Cyril Montacq, Muret; Jean Baricos, Ramonville Saint Agne, all of France

[73] Assignee: Etienne Lacroix Tous Artifices S.A., Muret, France

[21] Appl. No.: 09/167,545

[22] Filed: Oct. 7, 1998

[30] Foreign Application Priority Data

Oct. 8, 1997 [FR] France .................................. 97 12543

[51] Int. Cl.⁷ .................................................. B64D 17/02
[52] U.S. Cl. ........................ 244/138 A; 244/142; 244/145
[58] Field of Search ............................. 244/138 R, 138 A, 244/142, 143, 145, 152

[56] References Cited

U.S. PATENT DOCUMENTS

| | | |
|---|---|---|
| Re. 26,427 | 7/1968 | Jalbert ........................ 244/142 |
| 1,274,207 | 7/1918 | Sordyka ....................... 244/32 |
| 1,308,375 | 7/1919 | Satre ........................... 244/142 |
| 2,024,456 | 12/1935 | Kokaska ..................... 244/142 |
| 2,044,819 | 6/1936 | Taylor . |
| 2,440,292 | 4/1948 | Pitcairn et al. . |
| 3,013,493 | 12/1961 | Fletcher . |
| 3,073,555 | 1/1963 | Barish . |
| 3,150,850 | 9/1964 | Barish . |
| 3,333,643 | 8/1967 | Girard . |
| 3,860,203 | 1/1975 | Hyde . |
| 4,662,589 | 5/1987 | Allen et al. ................... 244/145 |
| 4,844,384 | 7/1989 | Barish . |
| 5,282,422 | 2/1994 | Borgström et al. . |
| 5,755,405 | 5/1998 | Socha et al. ................... 244/145 |
| 5,947,419 | 9/1999 | Warren et al. ............... 244/138 A |

FOREIGN PATENT DOCUMENTS

| | | | |
|---|---|---|---|
| 32482/89 | 11/1989 | Australia ................. | B64D 19/02 |
| 85954/91 | 4/1992 | Australia ................. | B64D 19/02 |
| 30167/92 | 6/1993 | Australia ................. | B64D 19/02 |
| 0 076 990 B1 | 4/1983 | European Pat. Off. ........ | F42B 13/32 |
| 0 176 046 A1 | 4/1986 | European Pat. Off. ........ | F42B 25/20 |
| 0 424 337 B1 | 4/1991 | European Pat. Off. ........ | F42B 10/50 |
| 2 375 491 | 9/1984 | France ..................... | F16D 57/00 |
| 660793 C | 5/1938 | Germany . | |
| 3221 453 A1 | 12/1983 | Germany ................. | B64D 19/02 |
| 5-338592 | 6/1992 | Japan ...................... | 244/146 |

*Primary Examiner*—Galen L. Barefoot
*Attorney, Agent, or Firm*—Pollock, Vande Sande & Amernick, R.L.L.P.

[57] ABSTRACT

A device for braking the fall of a load, the device having a flexible fabric structure with a central hub connected to at least two radial blades adapted to impart rotary motion to the structure, thereby generating lift, and suspension rigging connecting the flexible fabric structure to the load beneath it.

40 Claims, 4 Drawing Sheets

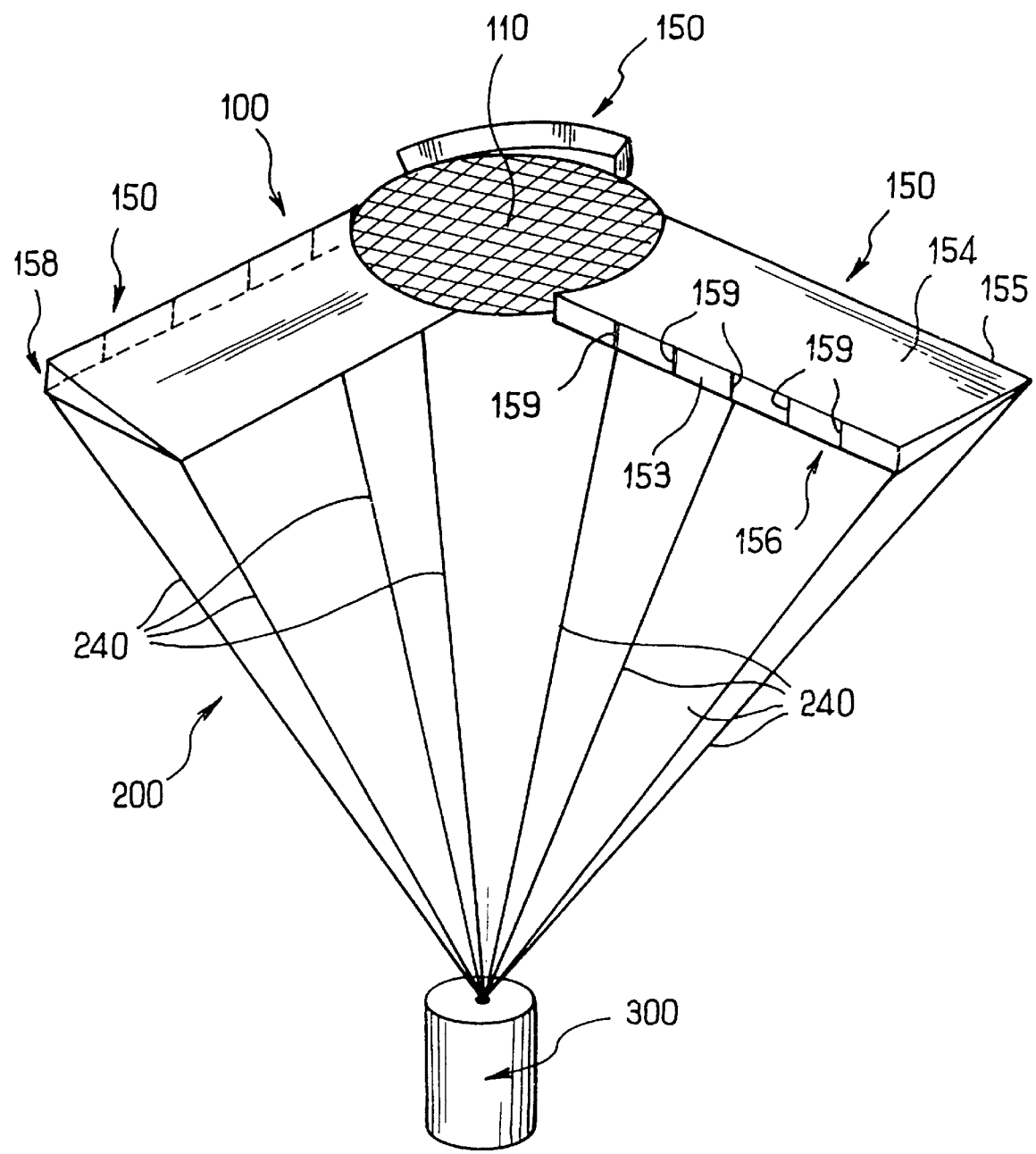

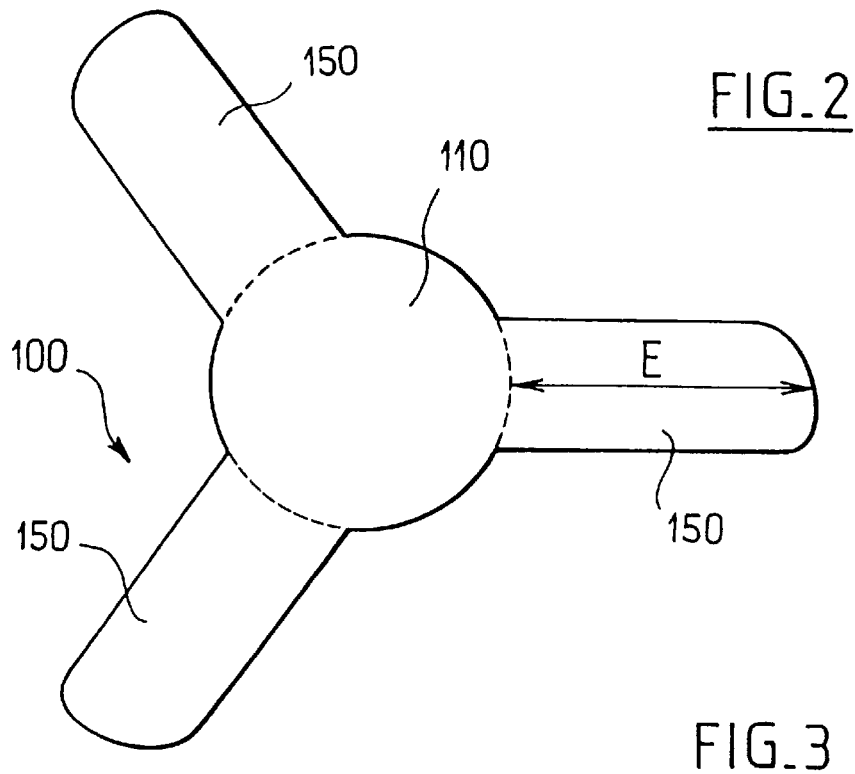
FIG_2
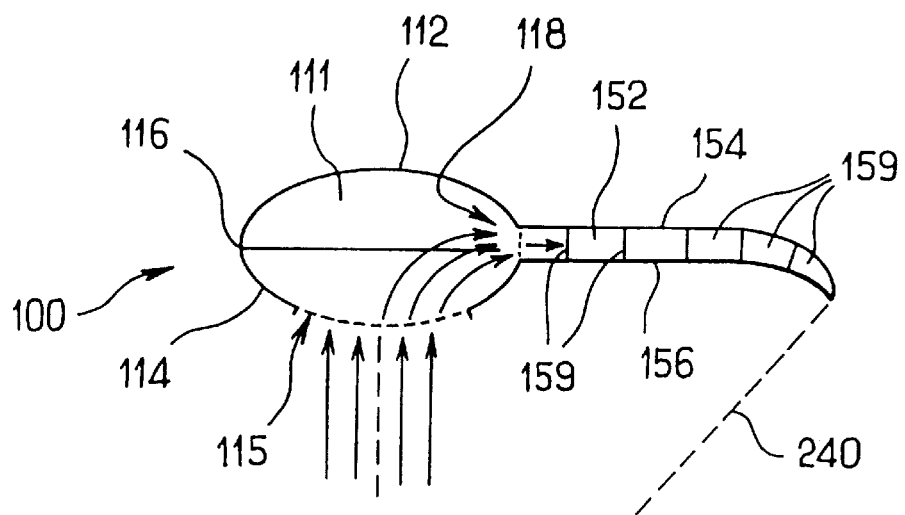
FIG_3
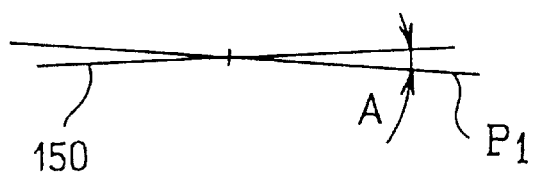
FIG_4

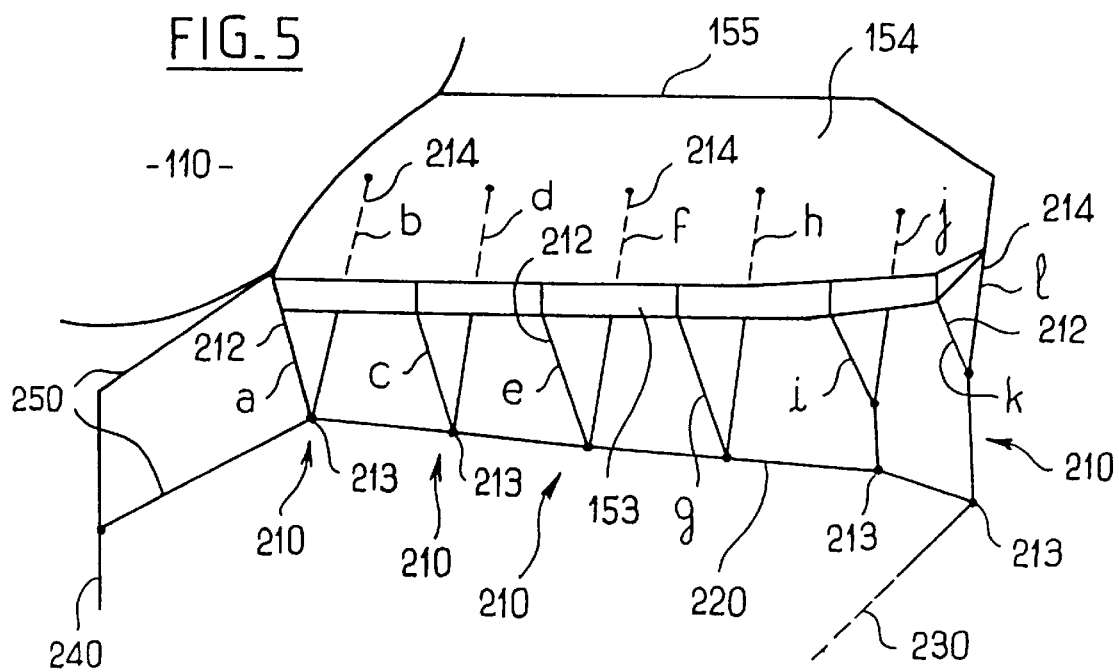
FIG_5
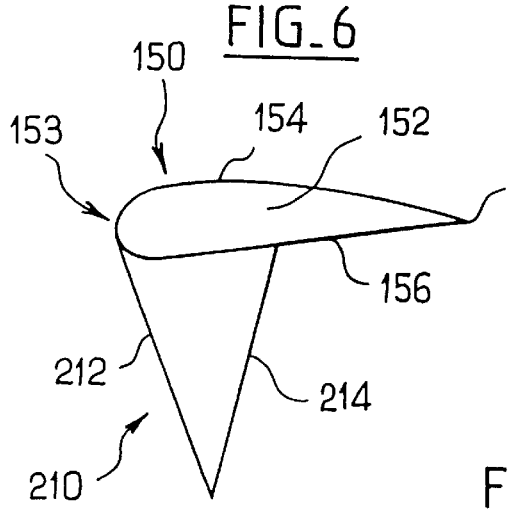
FIG_6
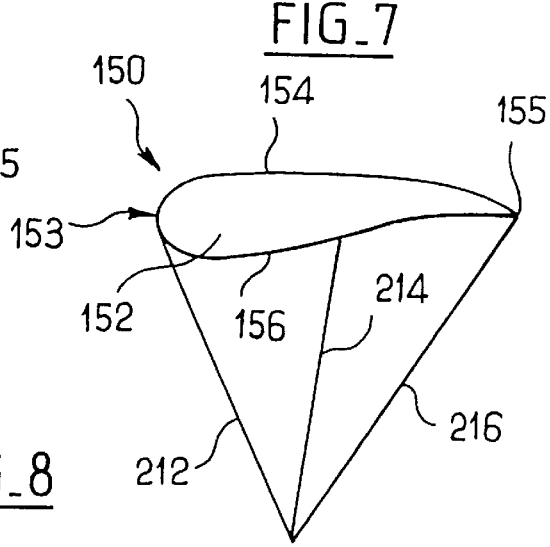
FIG_7
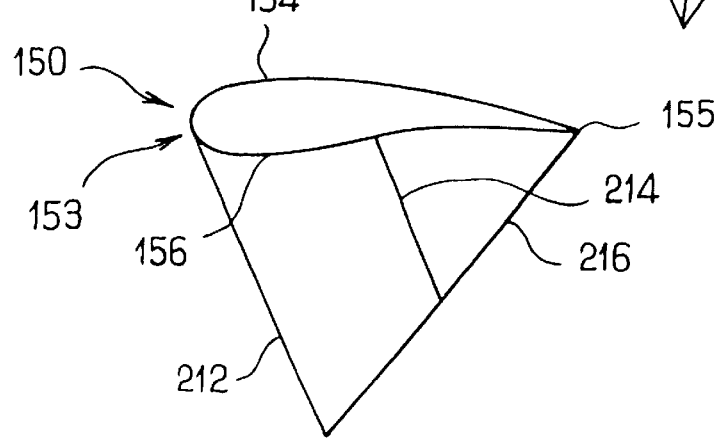
FIG_8

DEVICE FOR BRAKING THE FALL OF A LOAD

The present invention relates to the field of devices for braking the fall of a load.

BACKGROUND OF THE INVENTION

In numerous fields of application, it is desirable to brake the fall of a load.

For example, when dropping heavy loads from aircraft, it is necessary to brake the fall of a load strongly in order to ensure that it is brought to the ground under good conditions.

The same also applies to loads released from launchers, e.g. to generate prolonged lighting effects.

Numerous devices that are based on parachutes have already been proposed for this purpose.

Unfortunately, known devices of this type do not always give satisfaction. They are not always capable of applying sufficient braking for the loads concerned.

Typically, a parachute-based braking device makes it possible to obtain a sinking speed of about 3 meters per second (m/s) to 4 m/s, whereas it is often necessary to achieve sinking speeds of no more than 1 m/s to 2 m/s.

Solutions which associate parachutes with retrorockets have also been proposed. However, they turn out to be rather complex.

Numerous braking devices have also been proposed that are based on rotating blades. On this topic, reference can be made, for example, to the following documents: AU-A-85954/91, DE-A-32 21 453, EP-A-176 046, AU-A-131 368, U.S. Pat. No. 2,440,292, U.S. Pat. No. 2,044,819, AU-A-30167/92, EP-A-76990, FR-A-2 375 491, EP-A-424 337, EP-A-587 970, U.S. Pat. No. 5,282,422, U.S. Pat. No. 3,860,203, and AU-A-32482/89.

In general, those devices are nevertheless complex and bulky.

Other solutions are described in the following documents: AU-A-126869, U.S. Pat. No. 2,523,276, U.S. Pat. No. 3,228,637, FR-A-2 240 147, FR-A-2 722 471, EP-A-622 604, FR-A-2 595 809, FR-A-2 707 248, FR-A-2 679 643, and FR-A-2 679 642.

OBJECTS AND SUMMARY OF THE INVENTION

An object of the present invention is now to propose novel means enabling the fall of a load to be braked more effectively than with previously known devices. An auxiliary object of the present invention is specifically to propose novel means adapted to ensuring more rapid deployment of the braking system.

A particular object of the present invention is to propose novel means that are simultaneously compact in storage, highly reliable in operation, and of low cost.

In the context of the present invention, these objects are achieved by a braking device comprising:
 a flexible fabric structure comprising:
  a central hub connected to
  at least two radial blades adapted to impart rotary motion to the structure; and
 suspension rigging connecting the flexible fabric structure to the underlying load, each wing being made up of a top wall and a bottom wall connected together at a trailing edge but spaced apart at a leading edge so as to form an inlet passage at the leading edge through which air can penetrate into the wing.

As explained below, setting the device into rotation serves to impart lift to the radial blades made of flexible fabric.

According to another advantageous characteristic of the present invention, the central hub of the flexible fabric structure is constituted by a parachute or downwardly-open pouch, and the radial blades are made of inflatable canopies whose inside volumes communicate with the central hub so that the radial blades of flexible fabric are inflated and deployed by a flow of air coming from the central hub.

The present invention thus makes it possible to solve in effective manner the problem of inflating the radial canopies of flexible fabric.

BRIEF DESCRIPTION OF THE DRAWINGS

Other characteristics, objects, and advantages of the present invention appear on reading the following detailed description and from the accompanying drawings, given by way of non-limiting example and in which:

FIG. 1 is a diagrammatic perspective view of a device in accordance with the present invention;

FIG. 2 is a plan view of such a structure in the deployed state;

FIG. 3 is a diagrammatic vertical section view through a device in accordance with the present invention explaining how the radial blades are inflated and deployed in the context of the present invention;

FIG. 4 is a diagram showing how the radial blades are inclined relative to the mean plane of the central hub;

FIG. 5 shows an example of how the rigging lines can be implemented;

FIGS. 6 to 8 are vertical section views through three embodiments of radial blades in accordance with the present invention;

MORE DETAILED DESCRIPTION

Figure 10:
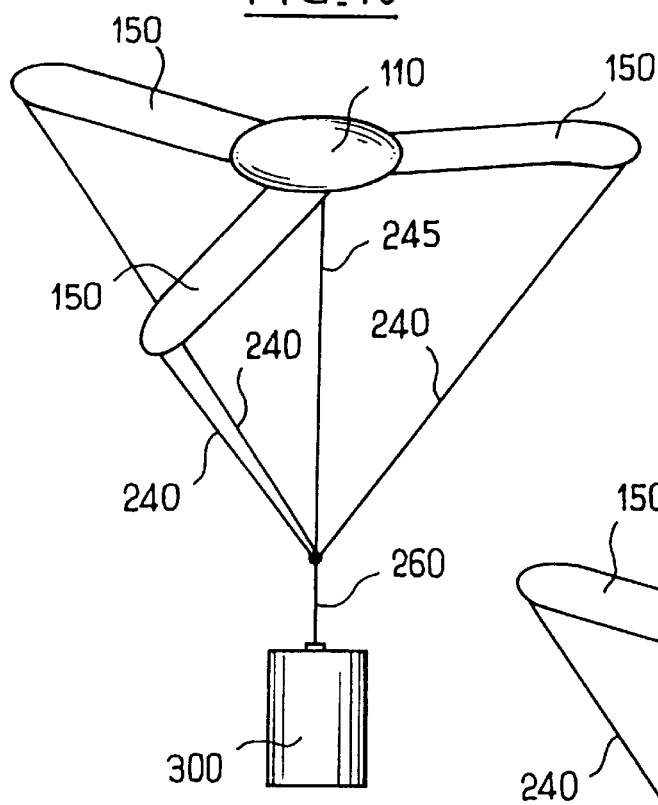
FIGS. 9 and 10 show to variant embodiments of rigging lines connected to the load.

As mentioned above, the braking device in accordance with the present invention essentially comprises a flexible fabric structure 100 and suspension rigging 200 which connect the flexible fabric structure 100 to the load 300 beneath it.

More precisely, according to the present invention, the flexible fabric structure 100 comprises a central hub 110 connected to at least two radial blades 150 adapted to impart rotary motion to the structure about its vertical central axis.

The central hub 110 of the flexible fabric structure 100 is preferably constituted by a parachute or downwardly-open pouch, and the radial blades 150 are preferably constituted by inflatable canopies whose inside volumes 152 are in communication with the central hub 110.

In this way, the radial blades 150 of flexible fabric are inflated and deployed by a flow of air coming from the central hub 110 as shown diagrammatically in FIG. 3. The hub 110 serves to maintain sufficient dynamic pressure inside the radial wings 150, as explained below.

The blades 150 are preferably all identical in structure.

In the context of the present invention, there are provided at least two blades 150, preferably three blades 150, and possibly even four or more blades.

The blades 150 are uniformly distributed around the vertical central axis of the hub 110.

The hub 110 may be constituted by a drogue type parachute, i.e. a parachute structure designed to perform slowing, stabilizing, and extractor functions.

In conventional manner, such a parachute is essentially made up of two superposed walls 112 and 114 that are peripherally interconnected at 116. The top wall 112 is in the form of a continuous disk. It takes on an upwardly convex bulging shape when in use, i.e. when the device is being used to brake a load, as can be seen for example in FIG. 3. The bottom wall 114 is in the form of a ring having a central opening 115 that is preferably circular. It takes up a downwardly convex bulging shape in use. Naturally, the outside diameters of both walls 112 and 114 must be identical or nearly identical so as to enable them to be joined together via their outer peripheries 116.

The inflatable wings forming the blades 150 are connected to the hub 110 in the vicinity of the join at 116 between the two walls 112 and 114 of the hub 110.

More precisely, cutouts 118 are provided in the hub 110 at this level to provide a fluid flow connection between the inside volume 111 of the hub 110 and the inside volume 152 of each blade 150.

These cutouts 118 are fitted with flexible webs allowing air to pass from the hub 110 into the blades 150, while nevertheless interconnecting the various peripheral zones of said cutouts 118 so as to ensure that the hub 110 deploys properly.

The size of the cutouts 118 preferably coincides with the size of the right cross-section at the radially inner end of each blade 150 so as to ensure that the blades 150 inflate and deploy properly with air coming from the hub 110.

Each wing 150 is preferably made up of a top wall 154 and a bottom wall 156. The walls 154 and 156 are interconnected at a rear or "trailing" edge 155. In contrast, the two walls 154 and 156 are spaced apart at a front or "leading" edge 153 to leave an inlet passage through which air can penetrate into the wing 150 when the device is rotating, as explained below.

The sectional area of the bottom opening 115 in the hub is preferably of the same order as the sum of the sectional areas of the cutouts 118 formed in the hub 110 to provide a link between the hub 110 and the wings 150, and is also of the same order as the sum of the open sectional areas admitting air into the leading edges 153. More generally, in the context of the present invention, the area of the bottom opening 115 in the hub 110 lies preferably in the range 0.1 times to 50 times, advantageously in the range 0.5 times to 5 times, and most advantageously, in the range 0.75 times to twice the sum of the areas of the cutouts 118 formed in the hub 110 for providing links between the hub 110 and the wings 150, or the sum of the areas of the air inlet passages formed in the leading edges 153.

The top wall 154 is advantageously smooth, having an upwardly directed convex bulge as can be seen in the accompanying figures.

The bottom wall 156 can also be smooth and have a downwardly-directed convex bulge or be slightly concave as can be seen for example in FIG. 6. In a variant, the bottom wall 156 can have an undulating shape, e.g. an S-shape in section in a plane parallel to the opening 118, as can be seen in FIGS. 7 and 8, thereby improving the lift of the wing.

The walls 154 and 156 are preferably interconnected by a series of vertical ribs 159 located in planes substantially perpendicular to the walls 154 and 156. These ribs 159 define cells going from the leading edge 153 to the trailing edge 155. Each cell has its own opening in the leading edge 153.

The attachment points for the rigging lines 200 are preferably situated at the bottom edges of the ribs 159.

Nevertheless, the ribs 159 are preferably perforated so as to avoid disturbing inflation of the various cells formed in this way by means of air penetrating into the inside volume 152 of the wings from the hub 110 via the openings 118.

The device in accordance with the present invention operates essentially as follows.

When the load 300 begins to fall, the parachute constituted by the hub 110 operates in drag like a conventional parachute. It inflates because of the flow of air penetrating through the bottom central opening 115 and it thus feeds the wings 150 via the openings 118 so as to deploy them. Thereafter it contributes to maintaining dynamic pressure inside the wings 150 and thus to maintaining wing profile. This continuous feed of air into the wings 150 from the hub 110 via the openings 118 is essential in the context of the present invention to ensure that the wings 150 remain properly deployed on a permanent basis even at low sinking speeds.

The hub 110 is centered on a vertical axis, the top wall 112 extending generally across said axis. The wings 150 extend in a mean plane that is horizontal or nearly horizontal, projecting radially out from the hub 110. Their profile generates a rotary torque on the structure, thereby causing it to rotate about the vertical axis.

This rotary motion serves to keep the wings 150 well deployed because of the air entering them via their leading edges 158, and thus enables the fall to be braked by ensuring the wings 150 provide proper lift.

The rotary motion also serves to dissipate a fraction of the energy that results from the fall in the form of kinetic energy of rotation.

In particular, the Applicant has performed highly satisfactory tests using a structure having a total mass of about 620 grams (g), the hub 110 having a diameter of about 1.20 meters (m), each wing 150 having a length of about 1.25 m, each wing 150 having a chord dimension of about 0.60 m, and a mean angle of inclination or setting "A" in a radial direction of each wing 150 relative to the horizontal plane P1 of the hub 110 of about 50, as shown diagrammatically in FIG. 4. This structure presents a total support area of about 3 m$^2$.

These values are nevertheless given purely by way of example, and cannot be considered as being limiting in any way.

The rigging 200 can be implemented in numerous ways, in particular to restrict the number of rigging lines.

In an embodiment shown in FIGS. 5 and 6, each wing 150 is connected to a set of underlying halyards 210 each made up of two strands 212 and 214 with the strand 212 being fixed to the leading edge 153 of the bottom wall 156 while the strand 214 is fixed substantially halfway across the width of said bottom wall 156 at a distance from the central axis of the structure that is substantially identical to the distance of the point of connection between the other strand 212 and the above-mentioned leading edge 153. These halyards 210 are thus generally V-shaped, flaring up towards the wing 150.

As can be seen in FIG. 5, some of the halyards 210 can have a common shank for both above-mentioned strands 212 and 214. In other words these halyards 210 are generally Y-shaped.

Thus, in the embodiment shown in FIG. 5, each wing 150 has four radially inner V-shaped halyards 210 and two radially outer Y-shaped halyards 210.

With reference to FIG. 5, the lengths of the various strands 212 and 214 making up the halyards 210 are as follows:

strand a: 56 mm strand b: 58 mm strand c: 46 mm strand d: 48 mm strand e: 46 mm strand f: 48 mm strand g: 57 mm strand h: 60 mm strand i: 48 mm strand j: 52 mm strand k: 48 mm, and strand l: 52 mm.

The bottom ends 213 of the halyards 210 are connected to a generally horizontal common strand 220.

The radially outer end of this strand 220 is connected to the load 300 by a rigging line 230.

Likewise, the radially inner end of the strand 220 is connected to the load 300 via a rigging line 240, where appropriate via auxiliary rigging line strands 250 themselves connected to the periphery of the hub 210, for example.

Figure 9:
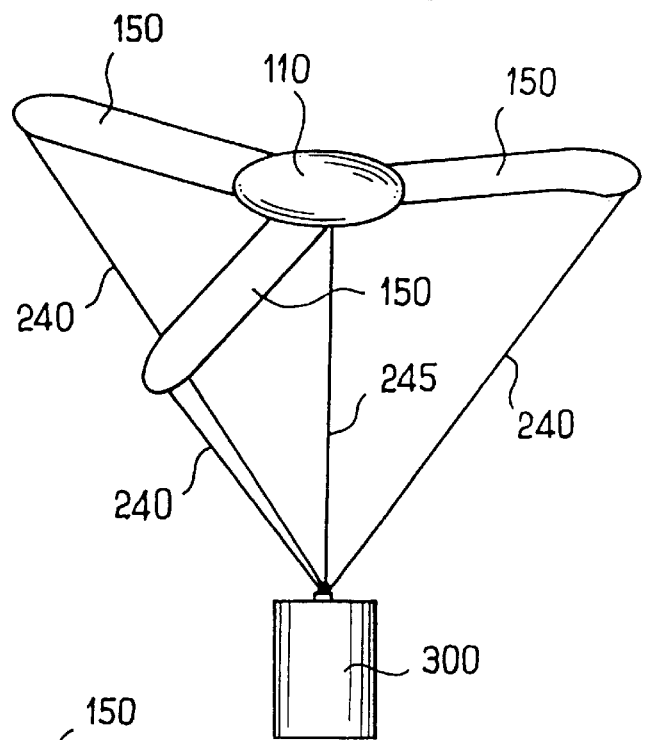

By way of non-limiting example, the rigging lines 230 and 240 are about 140 cm long.

Where appropriate, a central rigging line 245 (see FIGS. 9 and 10) connected to the auxiliary rigging lines 250 at its top end can be included in addition to the rigging lines 240 coming from each of the wings 150.

FIG. 3 shows a wing 150 having downwardly-directed concave curvature over its radial extent, with this being particularly marked at the radially outer end of the wing 150. However, in a variant, the rigging 200 can be of a length that is chosen to ensure that the wings are practically rectilinear in shape in the radial direction.

Naturally, the present invention is not limited to the embodiments described above, but extends to any variant within the spirit of the invention.

For example, FIG. 7 shows a variant embodiment in which each halyard 210 further includes a third strand 216 together with the strands 212 and 214. The top end of the strand 216 is connected to the trailing edge 255 while its bottom end is connected to the common strand 220.

FIG. 8 shows another variant embodiment of the halyards 210 in which each halyard 210 has two strands similar to the strands 212 and 216 described above, respectively connected to the leading edge 153 and to the trailing edge 155, together with an intermediate strand 214 whose top end is connected substantially halfway across the bottom wall 156 while its bottom end is connected substantially halfway along the associated strand 216.

The various configurations for the halyards 210 shown in FIGS. 7 and 8 are particularly suitable for wings 150 having a bottom wall 156 with an undulating profile.

In a variant, the wings 150 can be twisted so as to improve their aerodynamic performance. This twist, i.e. varying angle between the chord of the wings 150 and the horizontal need not be linear as a function of distance from the central axis of rotation. It may even change sign.

In another variant, the length of the chord of each wing 150 can vary (increasing or decreasing) along the length of the wing, i.e. radially relative to the hub.

In yet another variant, as shown in FIG. 10, an intermediate rigging line 160 of shock absorbing and/or resilient material can be interposed between the bottom ends of the main rigging lines 240 and the load 300 so as to reduce possible oscillation of the load 300 during the drop, and also reduce the shock applied to the load 300 when the structure 100 deploys.

Figure 11:
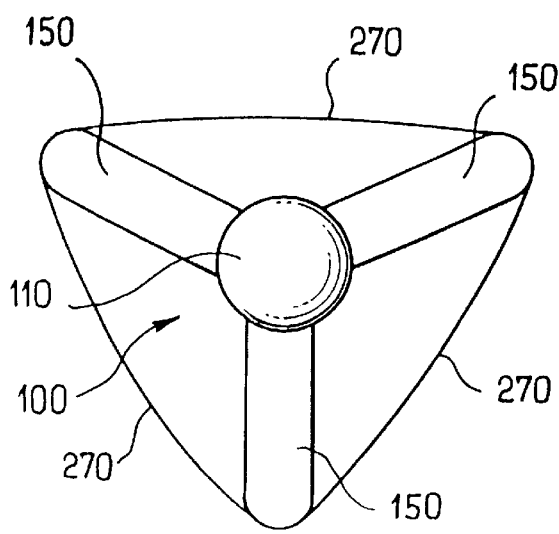
FIG. 11 is a view of a braking device in accordance with the present invention as seen from above.

As shown in FIG. 11, it is also possible to envisage connecting the wings 150 to one another via their radially outer ends via flexible links 270. This makes it possible to guarantee that the various wings 150 deploy and inflate simultaneously.

FIG. 1 shows another variant of the rigging in which the main lines 240 connect the load 300 directly to the leading and trailing edges 153 and 155 of the wings 150.

According to another optional characteristic of the present invention, a small thruster can be provided at the end of each wing 150 to accelerate its rotation and thus its aerodynamic performance, and in particular its lift.

It is also possible to provide an opening at the end of each wing 150 in the trailing edge 155 thereof, so as to allow a flow of air to escape and thus accelerate rotation of the canopy, for the same purpose as above.

The walls 112, 114, 154, and 156 making up the hub 110 and the wings 150 are advantageously made of textile material that is impregnated so as to be practically air-tight, however they may also be made of porous cloth, particularly for the lower surfaces.

The wings 150 can be connected to the hub 110 by stitching, for example.

The person skilled in the art will understand that the structure of the present invention can be folded for storage in a chamber of small volume.

In another variant embodiment of the present invention, the hub 110 can be made up solely of halyards.

According to another advantageous characteristic of the present invention, the root setting of the blades 150, i.e. the mean angle of inclination relative to the horizontal of the blades 150 where they join the hub 110 is negative, preferably lying in the range 0° to −45°, and most advantageously being about −5°. The term "negative" means that the blades 150 slope upwards relative to the horizontal when going from the leading edge 153 towards the trailing edge 155.

The Applicant has observed that the brake device of the present invention makes it possible to obtain much greater stability for the load than can be done with conventional devices, whether they are simple parachutes or wing type parachutes.

In another variant, the brake device of the present invention can be staged in the sense that the rotary wing device described above can be associated with at least one other superposed braking stage. The stage superposed in this way to the rotary wing can be formed by a conventional parachute. The stage superposed above the rotary wing can also be formed by a second rotary wing as described above. Under such circumstances, it is preferable for the two rotary wings to be adapted to rotate in opposite directions so as to improve the stability of the load.

Naturally a braking system could be designed with more than two stages.

What is claimed is:

1. A brake device for braking the fall of a load, the device comprising:

(a) a flexible fabric structure comprising
a central hub connected to at least two radial blades adapted to impart rotary motion to the structure; and (b) suspension rigging connecting the flexible fabric structure to the underlying load, each blade being made up of a top wall and a bottom wall connected together at a trailing edge but spaced apart at a leading edge so as to form an inlet passage at the leading edge through which air can penetrate into the "blade", wherein the central hub of the flexible fabric structure is constituted by a parachute or downwardly-open pouch, and the radial blades are made of inflatable canopies whose inside volumes communicate with the central hub so that the radial blades of flexible fabric are inflated and deployed by a flow of air coming from the central hub.

2. A device according to claim 1, wherein a mean inclination relative to the horizontal of the blades where they are connected to the hub is about −5°.

3. A device according to claim 1, comprising three blades uniformly distributed around the axis of the hub.

4. A device according to claim 1, wherein the blades are all identical in structure.

5. A device according to claim 1, wherein the central hub is made up of two superposed walls connected together via their periphery, namely a top wall in the form of a continuous disk that bulges convexly upwards in use, and a bottom wall in the form of a ring having a circular central opening.

6. A device according to claim 5, wherein the inflatable blades are connected to the hub in the vicinity of the join made between the two walls of the hub.

7. A device according to claim 1, wherein cutouts are formed in the hub to ensure a fluid flow connection between the hub and the blades, which cutouts are fitted with webbing allowing air to flow through while still interconnecting the various zones around the periphery of said cutouts.

8. A device according to claim 1, wherein the bottom wall of each blade is smooth and bulges convexly or is slightly concave in a downward direction.

9. A device according to claim 1, wherein the bottom wall of each blade is undulating in shape, e.g. being S-shaped.

10. A device according to claim 1, wherein the two walls making up a blade are interconnected by a series of vertical ribs disposed in planes substantially perpendicular to the two walls.

11. A device according to claim 10, wherein the fixing points for the rigging are situated in the bottom edges of the ribs.

12. A device according to claim 10, wherein the ribs are perforated to avoid disturbing inflation of the blades by the air penetrating into the volume of the blades from the hub.

13. A device according to claim 1, wherein each blade is connected to a set of halyards beneath the blade.

14. A device according to claim 13, wherein each halyard is constituted by two strands one fixed to the leading edge of the bottom wall of the blade, the other being fixed substantially halfway across the width of the bottom wall.

15. A device according to claim 14, wherein each halyard further includes a third strand whose top end is connected to the trailing edge.

16. A device according to claim 13, wherein each halyard has two strands connected respectively to the leading edge and to the trailing edge, and an intermediate strand whose top end is connected substantially halfway across the width of the bottom wall of the blade and whose bottom end is connected substantially halfway along one of the above-mentioned strands.

17. A device according to claim 13, wherein each halyard has two strands in a V-shaped configuration.

18. A device according to claim 13, wherein each halyard comprises two strands possessing a common bottom shank, organized in a Y-shaped configuration.

19. A device according to claim 13, wherein the bottom ends of the halyards are connected to a generally horizontal common strand.

20. A device according to claim 19, wherein the radially outer end and the radially inner end of the commons strand are connected to the load via respective rigging lines.

21. A device according to claim 1, including a central rigging line between the flexible fabric structure and the load.

22. A device according to claim 1, having an intermediate rigging line of shock absorbing and/or resilient material interposed between the bottom end of the main rigging lines and the load.

23. A device according to claim 1, wherein the blades are interconnected at their radially outer ends via a flexible link.

24. A device according to claim 1, including a thruster at the end of each blade.

25. A device according to claim 1, including an opening at the end of each blade in the trailing edge.

26. A device according to claim 1, wherein the hub is made up of halyards.

27. A device according to claim 1, wherein the section of the bottom opening of the hub lies in the range 0.1 times to 50 times, the sum of the sections of cutouts formed in the hub to provide a link between the hub and the blades.

28. A device according to claim 1, wherein the sectional area of the bottom opening of the hub lies in the range 0.1 times to 50 times, the sum of the sectional areas of the air inlet passages formed in the leading edges of the blades.

29. A device according to claim 1, wherein the setting at the root of the blades, i.e. the mean inclination relative to the horizontal of the blades where they are connected to the hub is negative.

30. A device according to claim 1, wherein the blades are twisted.

31. A device according to claim 30, wherein the twisting is not linear as a function of distance from the central axis of rotation.

32. A device according to claim 1, including at least one additional braking stage superposed above said flexible fabric structure forming a rotary blade.

33. A device according to claim 32, wherein the additional braking stage is constituted by a conventional parachute.

34. A device according to claim 1, including at least one additional braking stage superposed above said flexible fabric structure forming a rotary blade, wherein the additional braking stage is formed by a second flexible fabric structure forming a rotary blade.

35. A device according to claim 34, wherein the two stages of flexible fabric structures forming rotary blade are adapted to rotate in opposite directions.

36. A device according to claim 1, wherein the section of the bottom opening of the hub lies in the range of 0.5 to 5.0 times the sum of the sections of cutouts formed in the hub to provide a link between the hub and the blades.

37. A device according to claim 1, wherein the section of the bottom opening of the hub lies in the range of 0.75 to 2.0 times the sum of the sections of cutouts formed in the hub to provide a link between the hub and the blades.

38. A device according to claim 1, wherein the sectional area of the bottom opening of the hub lies in the range of 0.5 to 5.0 times the sum of the sectional areas of the air inlet passages formed in the leading edges of the blades.

39. A device according to claim 1, wherein the sectional area of the bottom opening of the hub lies in the range 0.75 to 2.0 times the sum of the sectional areas of the air inlet passages formed in the leading edges of the blades.

40. A device according to claim 1, wherein a mean inclination relative to the horizontal of the blades where they are connected to the hub is in the range of 0° to −45°.

* * * * *